United States Patent [19]

Hirano et al.

[11] 4,169,441
[45] Oct. 2, 1979

[54] ARRANGEMENT FOR CONTROLLING AN AIR-FUEL RATIO OF AN AIR-FUEL MIXTURE OF AN INTERNAL COMBUSTION ENGINE

[75] Inventors: Tadayoshi Hirano; Michio Kawagoe, both of Susono, Japan

[73] Assignee: Toyota Jidosha Kogyo Kabushiki Kaisha, Toyota, Japan

[21] Appl. No.: 834,553

[22] Filed: Sep. 19, 1977

[30] Foreign Application Priority Data

Mar. 30, 1977 [JP] Japan .................. 52/34743

[51] Int. Cl.$^2$ .......................... F02B 33/00
[52] U.S. Cl. .................. 123/119 EC; 123/124 R; 123/124 B
[58] Field of Search ............ 123/119 EC, 140 MC, 123/124 R, 124 B, 119 D; 60/276, 285

[56] References Cited

U.S. PATENT DOCUMENTS

| | | | |
|---|---|---|---|
| 3,861,366 | 6/1975 | Masaki et al. | 123/119 EC |
| 3,866,588 | 2/1975 | Nakada et al. | 123/124 R |
| 3,942,493 | 3/1976 | Linder et al. | 123/119 EC |
| 3,977,375 | 8/1976 | Laprade et al. | 123/124 R |
| 4,007,719 | 2/1977 | Brettenschnieder et al. | 123/119 D |
| 4,010,722 | 3/1977 | Laprade et al. | 123/119 D |
| 4,015,568 | 4/1977 | Horiye et al. | 123/124 R |
| 4,023,357 | 5/1977 | Masaki | 123/119 EC |
| 4,057,042 | 11/1977 | Aono | 123/119 EC |
| 4,062,337 | 12/1977 | Rivere | 123/124 B |
| 4,065,920 | 1/1918 | Minami et al. | 123/119 EC |

FOREIGN PATENT DOCUMENTS

| | | | |
|---|---|---|---|
| 51-30929 | 3/1976 | Japan | 123/119 EC |
| 51-11528 | 10/1976 | Japan | 123/119 EC |

OTHER PUBLICATIONS

SAE Paper 750371, pp. 145-154, Spilski and Creps.

Primary Examiner—Charles J. Myhre
Assistant Examiner—R. A. Nelli
Attorney, Agent, or Firm—Stevens, Davis, Miller & Mosher

[57] ABSTRACT

An arrangement for controlling an air-fuel ratio of an air-fuel mixture depending on changes in the operating condition of an internal combustion engine provided with a catalytic converter comprises a main fuel passage to supply a fuel forming part of a lean air-fuel mixture distributed into the engine, an enriching fuel supply passage which is opened by a valve actuated in response to an output of an operating condition-detecting means to enrich the lean air-fuel mixture to a level slightly leaner than a stoichiometric air-fuel ratio, and an additional fuel supply passage having an additional fuel supply nozzle capable of supplying a predetermined amount of an additional fuel into the engine to minutely correct the air-fuel ratio of the slightly leaner air-fuel mixture to the stoichiometric air-fuel mixture level.

13 Claims, 6 Drawing Figures

ARRANGEMENT FOR CONTROLLING AN AIR-FUEL RATIO OF AN AIR-FUEL MIXTURE OF AN INTERNAL COMBUSTION ENGINE

FIELD OF THE INVENTION

The present invention relates to an air-fuel ratio controlling arrangement for an internal combustion engine provided with a catalytic converter. More particularly, the present invention relates to an air-fuel ratio controlling arrangement for enriching a lean air-fuel mixture to be supplied to an internal combustion engine, depending on changes in the operating condition of the engine. Two separate enriching fuel supply systems are provided, one for effecting a first stage enriching of a lean air-fuel mixture to a level close to the stoichiometric air-fuel ratio and the other for minutely correcting the first stage enriched air-fuel mixture to the stoichiometric air-fuel ratio level, whereby the catalytic converter disposed in an exhaust system of the engine can effectively reduce the harmful components of exhaust gas from the engine.

BACKGROUND OF THE INVENTION

For the purpose of cleaning exhaust gases from automobiles a method has recently been adopted in which a known three way catalytic converter is employed for cleaning pollutants such as $NO_x$, CO and HC components. In order to enable the three way catalytic converter to attain its highest cleaning function, it is necessary for the air-fuel ratio of an air-fuel mixture burning in an auto vehicle engine to be adjusted within a very narrow range (0.3–0.4), with the stoichiometric ratio being the central value in this range. However, the stoichiometric air-fuel ratio is somewhat richer than that desired to achieve a reduction in fuel consumption and unburned hydrocarbon emissions.

It has recently been noted that the content of the $NO_x$ emission is low at constant speed cruising and a deceleration engine condition because of the lower engine load. Consequently, an air-fuel ratio control arrangement for an internal combustion engine has been adopted in which, under the above conditions, the air-fuel ratio of an air-fuel mixture is maintained at a leaner level to attain a sufficient reduction in fuel consumption and to reduce the overall amount of emitted harmful components such as $NO_x$, HC and CO. With this control arrangement, when a vehicle is operated under stop and go conditions requiring frequent acceleration for example, in heavy city traffic an additional fuel is supplied to control the air-fuel ratio of the air-fuel mixture to a value approximating the stoichiometric air-fuel ratio. Disposed in this air-fuel ratio control arrangement is a means for detecting the above driving conditions having a relation to the amount of $NO_x$ emitted from an engine. Therefore, a carburetor or fuel gas mixer of the engine is arranged so that under such low load or decelerating conditions an air-fuel mixture is made as lean as possible within the range wherein a misfire is not caused and is supplied to the engine which may be a gasoline engine or a liquefied petroleum gas engine (hereinafter referred to as "LPG engine"). Only when the above detecting means of the air-fuel ratio control arrangement detects conditions requiring the enrichment of the air-fuel ratio to the stoichiometric air-fuel ratio, does an air-fuel ratio sensor disposed in an exhaust pipe transmit a control signal to a feedback control circuit which causes an additional amount of fuel to be supplied to, for example, an intake manifold by an additional fuel supply nozzle so as to enrich the air-fuel mixture to the stoichiometric air-fuel ratio.

In the case of the LPG engine, in view of the fact that the propane-butane mixing ratio in the fuel is changed by the seasonal temperature change, it is necessary to set the air-fuel ratio under regular operation conditions to a leaner level of 18–19 although the stoichiometric air-fuel ratio is about 15.5. In the case where the difference between the stoichiometric air-fuel ratio and the air-fuel ratio of the predetermined lean mixture is relatively large and is about 3 and the above-mentioned control method is adopted, a large quantity of an additional fuel is supplied in an on-off manner due to occurence of a feedback control signal effecting the intended control of the air-fuel ratio causing surging in the output of the internal combustion engine and degraded engine performance. Moreover, after an additional fuel has been supplied by the additional fuel supply nozzle to compensate for the above-mentioned air-fuel ratio difference of about 3, the nozzle must perform a minute flow control corresponding to an air-fuel ratio of about 0.3 to about 0.4, so as to create exhaust conditions allowing the three way catalytic converter to act effectively. This means that the amount of fuel supplied from the nozzle is controlled in a flow amount range of 90 to 100% of the maximum flow amount. Therefore, the precision of the air-fuel ratio control by the additional nozzle is very poor. Because of these disadvantages the air-fuel control arrangement of the above-described type has not successfully been put into practical use.

Therefore, an object of the present invention is to provide an arrangement for controlling an air-fuel ratio of an air-fuel mixture supplied to an internal combustion engine, whereby the foregoing disadvantages encountered with the conventional control arrangement are eliminated.

Another object of the present invention is to provide an arrangement for controlling an air-fuel ratio of an air-fuel mixture supplied to an automobile engine where, in under stable running conditions the air-fuel ratio in the air-fuel mixture is maintained at a level as lean as possible to attain a decreased fuel consumption, and under driving conditions requiring a richer air-fuel ratio a precise feedback control of the air-fuel ratio is possible in a very narrow air-fuel ratio range with the stoichiometric air-fuel ratio being the central value thereby allow harmful pollutants in the exhaust gas to be sufficiently cleaned.

Briefly, in the present invention, a lean air-fuel mixture is supplied to a gasoline engine or LPG engine through a carburetor or fuel gas mixer and, when the air-fuel ratio is enriched to the stoichiometric air-fuel ratio by the feedback control, a passage of an additional fuel supply system communicated with the carburetor or mixer is opened in response to the output of the above-mentioned engine operation condition detecting means to enrich the air-fuel ratio to a level slightly leaner than the stoichiometric air-fuel ratio. By controlling the quantity of the fuel to be supplied by the additional fuel supply nozzle according to the output of an air-fuel ratio sensor, the air-fuel ratio of the lean air-fuel mixture to be supplied to the engine in which the air-fuel ratio has been controlled to a level close to the stoichiometric air-fuel ratio is further minutely and precisely adjusted to the stoichiometric air-fuel ratio by feedback control.

The present invention will become more apparent from the ensuing description of embodiments with reference to the accompanying drawings wherein.

Figure 1:
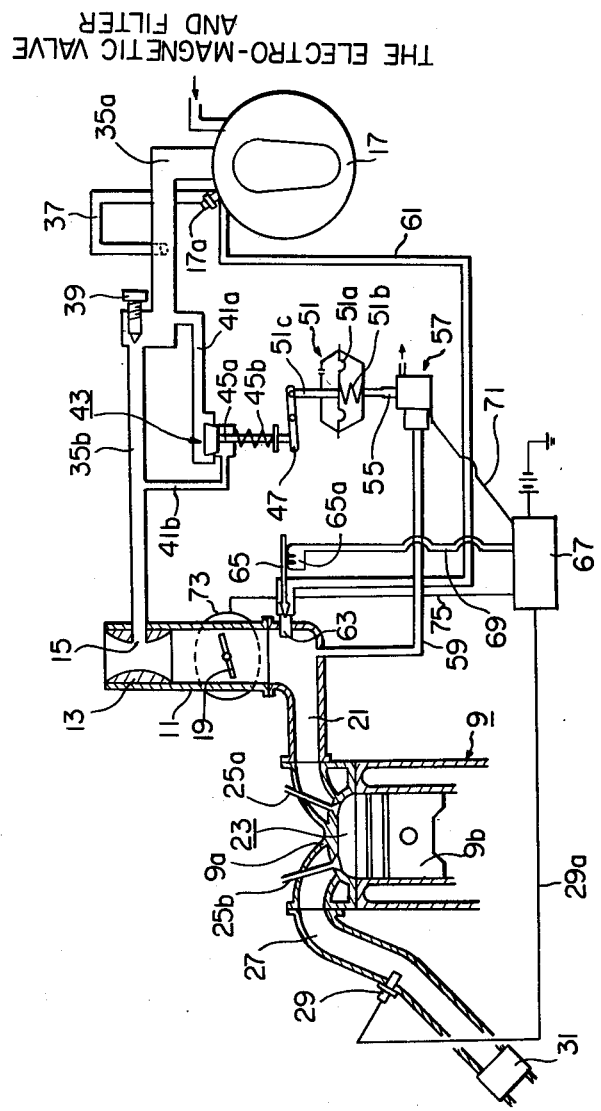
FIG. 1 is a block diagram of a first embodiment of an arrangement for controlling an air-fuel ratio of an air-fuel mixture to be fed into an internal combustion engine, according to the present invention.

FIG. 1 is a block diagram illustrating an embodiment in which an arrangement for controlling an air-fuel ratio of an air-fuel mixture according to the present invention is applied to a LPG engine. Referring to FIG. 1 reference numeral 9 designates one cylinder of the LPG engine, in which a combustion chamber 23 is formed between a cylinder head 9a and a piston 9b. The cylinder head 9a is further provided with an intake valve 25a opening and closing the passage between an intake manifold 21 and the combustion chamber 23, and an exhaust valve 25b opening and closing the passage between the combustion chamber 23 and an exhaust pipe 27. The intake manifold 21 is communicated with a fuel gas mixer 11 through a throttle valve 19. The mixer 11 includes a fuel supply main port 15 opened to a venturi portion 13 and air is fed from above the main port 15. An LPG fuel for the LPG engine is supplied to a regulator 17 of any well known type, for example, of the type discussed on page 176 of the sixth edition of "Automotive Mechanics", published by McGraw-Hill, through a solenoid valve (not shown) and a filter (not shown), and the inside pressures of a first and a second chamber in the regulator 17 are maintained at $0.33 \pm 0.05$ Kg/cm$^2$ and atmospheric pressure, respectively. The second chamber of the regulator 17 is communicated with the main port 15 through main fuel passages 35a and 35b. Accordingly, the LPG fuel in the second chamber is fed into the mixer in proportion to the negative pressure generated by the stream of air running in the venturi portion 13. Reference numeral 39 represents an adjustment screw disposed between the main fuel passages 35a and 35b which is used to adjust the cross-sectional area of the passages thereby appropriately controlling the flow amount supplied from the main port of the fuel for attaining a predetermined air-fuel ratio. The LPG fuel in the first chamber of the regulator 17 is supplied to a fuel passage 61 and to a fuel passage 37 at a constant fuel rate, under a fuel pressure of $0.33 \pm 0.05$ Kg/cm$^2$. This pressure is maintained by adjusting the passage area at the regulator outlet by an idling adjustment screw 17a. The fuel passage 37 is communicated with the main fuel passage 35a. Accordingly, at the time of an idling operation, or a low speed operation, when the degree of the negative pressure is low in the venturi portion 13, the LPG fuel fed to the fuel passage 37 by dint of the above-mentioned fuel pressure of $0.33 \pm 0.05$ Kg/cm$^2$ is supplied to the mixer 11 through the main port 15. On the other hand, the LPG fuel supplied to the fuel passage 61 is fed to an additional fuel supply nozzle 63 attached to the intake manifold 21, through a needle valve 65 as an additional fuel for feedback control of the air-fuel ratio. The needle valve 65 is retreated or projected when solenoid coil 65a is excited or de-energized in response to a control signal applied from a known control computer 67, for example, of the type illustrated in FIGS. 3 and 5 of U.S. Pat. No. 3,890,946, through a control signal line 69, whereby the additional fuel supply nozzle is opened or closed. The control computer 67 receives through a signal line 29a a detection signal emitted from a known air-fuel ratio sensor 29 disposed in the exhaust pipe 27 of the LPG engine when it detects indirectly the air-fuel ratio in the mixture fed to the combustion chamber 23 while sensing the oxygen gas content in the exhaust gas. As pointed out hereinbefore, the control computer 67 transmits a feedback control signal for the air-fuel ratio control to the solenoid coil 65a of the needle valve 65 through a control signal line 69. A known three way catalytic converter 31 is attached to the exhaust pipe 27. Reference numeral 73 designates a switch which operates so as to detect a predetermined opening position of the throttle valve 19, thereby detecting a predetermined operating condition of the LPG engine requiring the feedback control of the air-fuel ratio of the air-fuel mixture fed to the LPG engine. The switch 73 is electrically connected to the control computer 67 by means of a signal line designated by reference numeral 75.

In this embodiment, a control signal is fed from the control computer 67 through another signal line 71 to a valve 57 for opening or closing a negative pressure passage. The structure of this valve 57 is known, an exemplary description thereof can be found in the "Toyota Emission Control Repair Manual for USA and Canada 1976 Model" at pages 1-3, 6-1 and 6-2. More specifically, according to the excited or de-energized state of a solenoid coil (not shown), a valve opening (not shown) formed in the interior of the valve 57 is opened or closed. When this valve opening is opened, a negative pressure pipe passage 59 connected to the intake manifold 21 and a negative pressure pipe passage 55 connected to a lower chamber of a diaphragm device 51 are communicated with each other, so that the negative pressure in the intake manifold is introduced into the lower chamber of the diaphragm device 51. When the valve opening is closed, the negative pressure pipe passage is connected to the atmosphere and the atmospheric pressure is introduced into the lower chamber of the diaphragm device 51. Namely, the control signal of the control computer 67 is fed to the solenoid coil of the negative pressure passage opening or closing valve 57 through the control signal line 71. In the diaphragm device 51, the lower chamber is separated from an upper chamber by a diaphragm 51a and a compression spring 51b is disposed in the lower chamber. The diaphragm 51a is attached to the lower end of an operation rod 51c and the upper end of the operation rod 51c is connected to one end of a pivotable link 47. Therefore, when the negative pressure in the intake manifold is introduced into the lower chamber of the diaphragm device 51, and when a predetermined level of the negative pressure is produced in the lower chamber, the diaphragm 51a pulls down the operation rod 51c against the force of the compression spring 51b to cause the pivoting of the link 47 in the clockwise direction in FIG. 1. On the other hand, when the atmospheric pressure prevails in the lower chamber, under the action of the compression spring 51b the diaphragm 51a restores the operation rod 51c to the normal position and also the link 47 is pivoted in the counterclockwise direction in FIG. 1 to the substantially horizontal normal position shown in FIG. 1. The other end of the link 47 is engaged with the lowermost end of a valve rod 45a of a control valve 43. When the link 47 is kept in the above-mentioned normal position, the control valve 43 is lowered to the closing position thereof shown in FIG. 1 by the action of a restoring spring 45b. When the link 47 is pivoted in the clockwise direction in FIG. 1 by the diaphragm device 51, the valve rod 45a is moved upwardly against the force of the restoring spring 45b to open the control valve 43. This control valve 43 is disposed as a valve for opening or interrupting communication between a fuel passage 41a and a fuel passage 41b, which are disposed as an additional fuel supply passage for additionally supplying an LPG fuel from the main fuel passage 35a when the control valve 43 is opened. Accordingly, when the control valve 43 is closed, the additional fuel supply passages are interrupted and, therefore, only the LPG fuel supplied to the main fuel passage 35b from the main fuel passage 35a and fuel passage 37 through the adjustment screw 39 is fed to the main port 15. Hence, if the sectional area of the passage is diminished by the adjustment screw 39, the absolute amount of the LPG fuel fed to the fuel gas mixer 11 is reduced and the air-fuel ratio of an air-fuel mixture to be supplied to the LPG engine, which is formed in the mixer 11, is set to a leaner level, for example, 16 to 18.

The operation of the first embodiment will now be described.

When the LPG engine is operated under low-load stable driving conditions, it is necessary to maintain a lean air-fuel ratio of an air-fuel mixture to be supplied to the engine and reduce the fuel consumption while reducing the overall content of harmful pollutants in the exhaust gas. The absolute amount of the LPG fuel fed to the engine is controlled by the adjustment screw 39 disposed between the main fuel passages 35a and 35b, and the air-fuel ratio is set at a level as lean as possible within a range in which misfires do not occur. Further, since the opening of the throttle valve 19 is reduced under low-load stable driving conditions, the switch 73 detects the reduction of the opening of the valve 19 and cuts the circuit in the control computer 67, so that no control signals are emitted through the control lines 69 and 71 from the control computer 67. As a result, the solenoid coil 65a of the needle valve 65 and the solenoid coil of the valve 57, which opens and closes the negative pressure passage, are both kept in the de-energized state. Consequently, both the additional fuel supply nozzle 63 and the valve 43, to be actuated by the diaphragm device 51 through the link 47, are closed. Accordingly, only the lean air-fuel mixture in an amount proportional to the degree of the negative pressure in the venturi portion 13 is fed to the mixer 11, and only this lean mixture is supplied to and burned in the combustion chamber of the LPG engine. As a result, the fuel consumption in the LPG engine is reduced and the absolute amounts of pollutants incorporated in the exhaust gas, such as HC, CO and $NO_x$, can be reduced.

When the LPG engine is operated under medium-load or high-load conditions, for example, when the vehicle is accelerated, the opening of the throttle valve is increased. When the switch 73 detects the increase of the opening of the throttle valve 19, the circuit in the control computer 67 is turned on so that control signals are fed to both control signal lines 69 and 71 from the computer 67. As a result, the control signal is supplied to the solenoid coil of the valve 57, for opening the negative pressure passage, through the signal line 71 and the valve 57 is actuated to transmit the negative pressure in the intake manifold to the diaphragm device 51. Accordingly, the diaphragm device 51 is actuated to open the valve 43 and communicate the additional fuel supply passages 41a and 41b with each other. Accordingly, the air-fuel ratio of the air-fuel mixture fed to the LPG engine from the mixer 11 is enriched to a level slightly leaner than the stoichiometric air-fuel ratio, for example, about 16.5. Simultaneously with this enrichment operation, the control computer 67 feeds the control signal to the solenoid coil 65a of the needle valve 65 based on the signal of the air-fuel ratio detected from the oxygen concentration in the exhaust gas, whereby the solenoid coil 65a is excited to control the opening of the additional fuel supply nozzle 63 and effect the feedback control of the air-fuel ratio of the air-fuel mixture to be supplied to the engine to the stoichiometric air-fuel ratio. Since the air-fuel ratio of the air-fuel mixture to be supplied to the engine under low-load stable driving conditions is set at a level as lean as possible, there is a great difference between this lean air-fuel ratio and the stoichiometric air-fuel ratio. According to the conventional technique, this enrichment of the air-fuel ratio of the lean mixture to the stoichiometric air-fuel is accomplished by a fuel supplied by only the additional fuel nozzle 63. In contrast, in the present embodiment, an additional fuel is supplied to the main port 15 of the mixer 11 from the additional fuel supply passages 41a and 41b to enrich the air-fuel mixture in the venturi portion 13 so that the air-fuel ratio is sufficiently close to the stoichiometric air-fuel ratio, and; then, an additional fuel is further supplied to the intake manifold 21 from the nozzle 63 so that the air-fuel ratio is finally controlled in a very narrow range with the stoichiometric air-fuel ratio being as the central value. Accordingly, the amount of the additional fuel supplied from the additional fuel supply nozzle 63 is very small and, by this very small amount of the fuel, minute control of the air-fuel ratio can be accomplished. Therefore, when the arrangement of the present embodiment is employed in the LPG engine, under driving conditions where acceleration is conducted frequently, the air-fuel ratio in the air-fuel mixture to be supplied to the LPG engine can be precisely and minutely adjusted and controlled in a very narrow range with the stoichiometric air-fuel ratio being the central value. As a result, the exhaust gas cleaning function of the three way catalytic converter 31 can be exerted most effectively. Moreover, occurrence of surging of the engine output can be effectively prevented. Incidentally, when the opening of the throttle valve 19 exceeds a certain amount, by an appropriate known link mechanism and cam device (not shown) associated with the throttle valve 19, the valve rod 45a of the control valve 43 is pushed upwardly so as to open the valve 43 and communicate the fuel passages 41a and 41b with one another. As a result, these fuel passages 41a and 41b can act as a power fuel system for temporarily enriching the air-fuel mixture within the fuel gas mixer 11.

Figure 3:
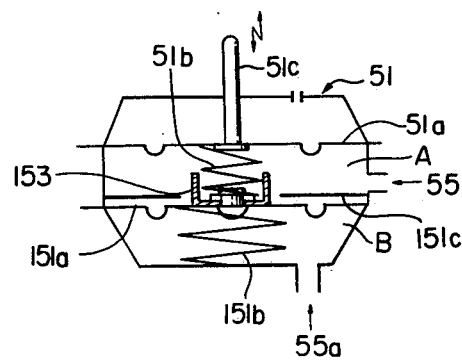
FIG. 3 is a schematic cross-sectional view illustrating an internal structure of a diaphragm device to be applied to the second embodiment shown in FIG. 2.
Figure 4:
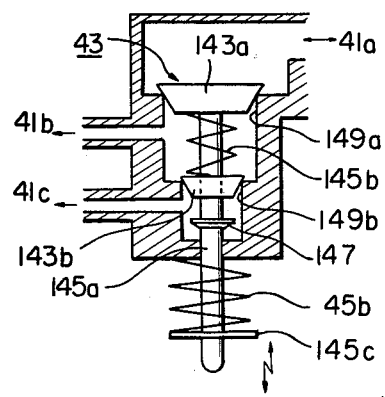
FIG. 4 is a diagrammatic cross-sectional view of a control valve for opening and closing an additional fuel supply passageway, which is applied to the second embodiment shown in FIG. 2.

A second embodiment of the present invention will now be described with reference to FIGS. 2 through 4.

Figure 2:
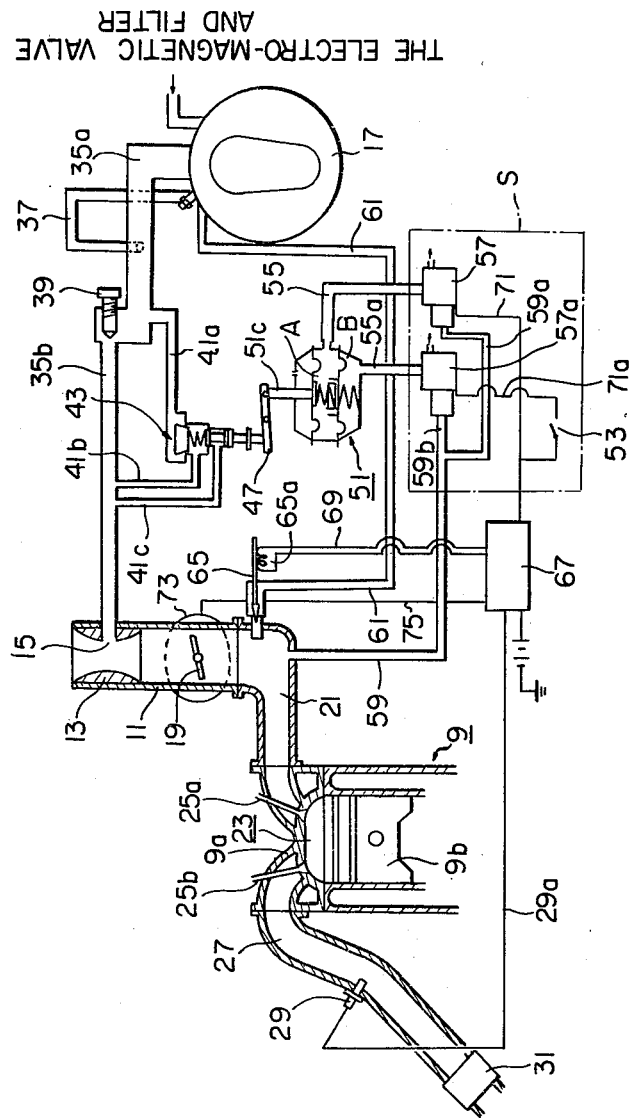
FIG. 2 is a block diagram of a second embodiment of the present invention.

FIG. 2 is a block diagram illustrating the second embodiment of the arrangement of the present invention, which is applied to an LPG engine similar to the engine of FIG. 1. The second embodiment is so arranged that even under the operating conditions of the engine where the amount of intake air of the LPG engine is increased, the control of the air-fuel ratio can be accomplished with certainty. It should be noted that in the embodiment shown in FIG. 2, the same elements or parts as in the embodiment of FIG. 1 are designated by the same reference numerals.

Differences of the arrangement of the embodiment shown in FIG. 2 from the arrangement of the embodiment shown in FIG. 1 will now be described.

In the embodiment shown in FIG. 2, an additional LPG fuel is supplied to the main port 15 through a main fuel passage 35b from a fuel passage 41a connected to a main fuel passage 35a through fuel passages 41b and 41c communicated or interrupted by the control valve 43. Accordingly, the internal structure of the control valve 43 in this embodiment is different from the internal structure of the valve 43 of the embodiment in FIG. 1, as illustrated hereinafter with reference to FIG. 4. Namely, the valve 43 is arranged so that the fuel passages 41b and 41c are opened in succession through the link 47 by the operation of the diaphragm device 51. Moreover, as illustrated hereinafter with reference to FIG. 3, the diaphragm device 51 is arranged so that the operation rod 51c is operated in the vertical direction in two stages to cause the pivoting of the link 47 in two stages. In addition to the valve 57, for opening or closing the negative pressure passage, there is disposed another valve 57a having the same structure for opening or closing the negative pressure passage. These valves 57 and 57a are communicated through branched negative pressure pipe passages 59a and 59b with a negative pressure pipe passage 59 connected to the intake manifold 12. The output signal of the air-fuel ratio sensor 29 and the output signal of the switch 73 are applied to the control computor 67 through signal lines 29a and 75, respectively, whereby control signals are emitted to control signal lines 69 and 71 as in the embodiment shown in FIG. 1. The control signal fed to the control line 71 from the control computor 67 is also supplied to solenoid coil (not shown) of the valve 57a through a control signal line 71a for opening the negative pressure passage when a transmission switch 53 is closed. Namely, if the valves 57 and 57a are excited by the control signals from the control computer 67 when the transmission switch 53 is closed, the negative pressure in the intake manifold is introduced into both the valves 57 and 57a through the negative pressure pipe passage 59 and branched negative pressure pipe passages 59a and 59b, and it is then introduced into two lower chambers A and B of the diaphragm device 51 through negative pressure pipe passages 55 and 55a. The transmission switch 53 is opened or closed co-operatively with the transmission operation of a vehicle to which the LPG engine is attached, so that the transmission switch 53 is closed when the transmission is shifted to the low-speed position and it is opened when the transmission is in the high-speed position. In short, the transmission switch 53 is closed under high-load operating conditions of the engine and it is opened under medium-load operating conditions.

The internal structure of the diaphragm device 51 to be applied to the embodiment shown in FIG. 2 will now be described with reference to FIG. 3.

The interior of the diaphragm device 51 is divided into an upper atmospheric pressure chamber and the above-mentioned lower chambers A and B by diaphragms 51a and 151a, and an operation rod 51c is connected to the diaphragm 51a. A compression spring 51b is disposed between the diaphragm 51a and a spring seat 153. A compression spring 151b in the chamber B is disposed between the diaphragm 151a and the inner wall of the valve casing. Moreover, a stopper plate 151c connected to the inner wall is disposed in the chamber A near the diaphragm 151b. In the diaphragm device 51 having the above-mentioned structure, when the negative pressure is applied only to the lower chamber A, the operation rod 51c makes a first displacement stroke downwardly, and; when the negative pressure is applied also to the lower chamber B, the rod 51c makes a second displacement stroke downwardly. When spring constants of the compression springs 51b and 151b are appropriately chosen, the first and second strokes can be set at desirable magnitudes. Also in the embodiment shown in FIG. 2, the upper end of the operation rod 51c is connected to the right end in FIG. 2, of the link 47 as in the embodiment shown in FIG. 1.

The structure of the valve 43 of FIG. 2 to be actuated by the diaphragm device 51 through the link 47 will now be described with reference to the cross-sectional view of FIG. 4.

The valve 43 comprises an upper valve element 143a and a lower valve element 143b. The upper valve element 143a opens or closes a valve opening 149a and the lower valve element 143b opens or closes a valve opening 149b. A valve rod 145a is extended downwardly from the upper valve element 143a, and the lower valve element 143b is slidably fitted to the valve rod 145a. A push-up seat 147 is fixed to the valve rod 145a. A return spring 45b of the valve element 143a is mounted between a spring-receiving plate 145c and the outer wall of the valve casing. Another spring 145b is disposed between the upper and lower valve elements 143a and 143b and acts as a return spring for the lower valve element 143b. That is to say, both the return springs 45b and 145b always urge the valve element 143a and 143b, respectively, toward the valve-closing positions. FIG. 4 illustrates the state where both the valve elements 143a and 143b are thus urged to the closing positions. With the valve 43 kept in the open state, if the lowermost end of the valve rod 145a is pushed upwardly, the valve rod 145a is moved upwardly against the force of the return spring 45b and, as a result, the valve element 143a disposed on the top end of the valve rod 145a is moved so as to open the valve opening 149a and communicate the passages 41a and 41b with each other. When the valve rod 145a is further moved upwardly, the push-up seat 147 impinges against the lower valve element 143b, thereby pushing up the valve element 143b. As a result, the valve 149b is also opened to communicate the passages 41a and 41c with each other. As will be apparent from the above described structure, in the valve 43 shown in FIG. 4, by pushing the lowermost end of the valve rod 145a upwardly, the upper valve opening 149a is first opened, and when the rod 145a is further pushed upwardly, the lower valve opening 149b is also opened. In the embodiment shown in FIG. 2, the valve 43 having the above described structure is disposed so that the valve rod 145a is pushed upwardly through the link 47 by the diaphragm device 51.

The operation of the embodiment of FIG. 2, in which the above described diaphragm device 51 and valve 43 are disposed, will now be provided.

When the LPG engine is operated under low-load stable operating conditions, as in the embodiment shown in FIG. 1, all the control signals to be fed to the control signal lines 69, 71 and 71a from the control computer 67 are cut and the LPG engine is driven by a lean air-fuel mixture fed through the fuel gas mixer. Accordingly, both the fuel consumption and the content of harmful pollutants in the exhaust gas can be reduced. When the air-fuel ratio of the air-fuel mixture to be fed to the LPG engine is feedback-controlled to a value approximating to the stoichiometric air-fuel ratio, by shifting of the transmission to the low or second speed position where the load is increased, the transmission switch 53 is closed and control signals from the control computer 67 are fed into the control signal lines 69, 71 and 71a. When the transmission is shifted to the high gear position, the transmission switch 53 is opened, and the solenoid coil 65a of the needle valve 65 and the solenoid coil of the valve 57 can be excited by the control signals from the control computor 67 through the control signal lines 69 and 71. However no signal is fed into the control signal line 71a and the solenoid coil of the valve 57a is not excited. When the air-fuel ratio is feedback-controlled, a fuel is supplied from the additional fuel supply nozzle 63 controlled by the air-fuel ratio sensor 29, irrespective of whether the transmission switch 53 is opened or not, and the air-fuel ratio of the air-fuel mixture to be supplied to the engine is controlled within a very narrow range with the stoichiometric air-fuel ratio being the central value. In this case, if the transmission switch 53 is opened, the opening of the additional fuel supply nozzle 63 is controlled by the control signal from the control computer 67, and by opening of the valve 57, the negative pressure in the intake manifold 21 is introduced into the lower chamber A of the diaphragm device 51 through the negative pressure passages 59, 59a and 55. As a result, only the upper valve element 143a of the valve 43 is opened (see FIG. 4) and the additional fuel supply passages 41a and 41b are communicated with each other. Namely, when the LPG engine is under low-load operating conditions, as in the embodiment shown in FIG. 1, the lean air-fuel ratio is first corrected to a value close to the stoichiometric air-fuel ratio by the fuel supplied from one additional fuel supply system including the fuel passages 41a and 41b, and then, the air-fuel ratio is feedback-controlled to a value substantially equal to the stoichiometric air-fuel ratio by the addition of the fuel supplied from the additional fuel supply nozzle 63. When the transmission is shifted to a high-load position, such as the low gear position or second gear position, as pointed out hereinbefore, the control signals generated from the control computer 67, are supplied to not only the solenoid coil 65a of the needle valve 65, but also to the solenoid coils of the valves 57 and 57a through the signal lines 69, 71 and 71a. Namely, in the high-load operation of the LPG engine, the negative pressure in the intake manifold is simultaneously introduced into both the lower chambers A and B of the diaphragm device 51 through the two valves 57 and 57a, and therefore, openings 149a and 149b are opened by the valve elements 143a and 143b of the valve 43. As a result two fuel supply systems, namely the fuel supply passage 41a and the fuel supply passages 41b and 41c, are formed and the fuel is additionally supplied to the air-fuel mixture to be fed by the mixer 11 to the engine, through the two fuel supply systems during the high-load driving. Accordingly, even if the amount of intake air of the LPG engine is increased, a large quantity of the fuel can be supplied with ease and the air-fuel ratio of the lean mixture can be brought very close to the stoichiometric air-fuel ratio with no difficulty.

As will be apparent from the foregoing illustration, in the second embodiment of the control arrangement of the present invention shown in FIG. 2, even if the operating conditions of the LPG engine are changed so that the amount of the intake air is greatly increased while the feedback control of the air-fuel ratio is exercised, the amount of the fuel to be additionally supplied to the fuel gas mixer 11 can be increased without difficulty so as to meet the increase in the amount of the intake air. Therefore, it is not required for the amount of the fuel supplied from the additional fuel supply nozzle 63 to be increased even if the above-mentioned increase of the intake air takes place. As a result, it is always possible to maintain the amount of the fuel supplied from the additional fuel supply nozzle 63 at a smallest possible level. Consequently, the precision of the feedback control of the air-fuel ratio of the air-fuel mixture fed to the LPG engine can be very high. It will naturally be understood that, in the case where the LPG engine of FIG. 2 is replaced with a gasoline engine, the precision of the feedback control of the air-fuel ratio can also be kept high.

Figure 5:
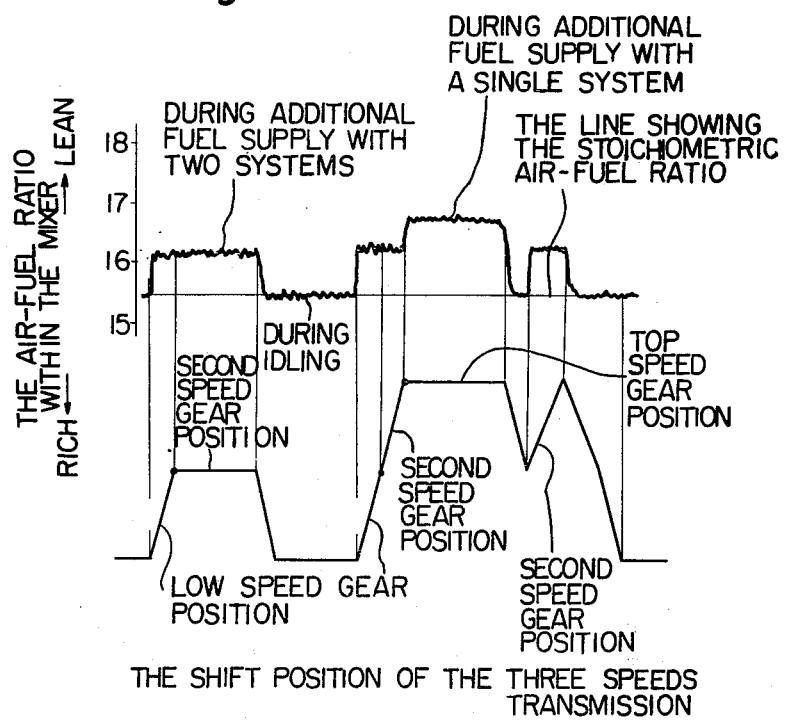
FIG. 5 is a diagram illustrating a relationship of the change in an air-fuel ratio of an air-fuel mixture within a fuel gas mixer used in the second embodiment of FIG. 2 and the change in the shift position of a three-speed transmission.

FIG. 5 illustrates the change in the air-fuel ratio of the air-fuel mixture in the fuel gas mixer 11 of the LPG engine provided with the air-fuel ratio control arrangement of the embodiment shown in FIG. 2, which is caused by the shifting of the gear position in a vehicle having a three speed transmission. From FIG. 5, it will readily be understood that since the fuel is supplied from the two additional fuel supply systems, in the low or second gear position the air-fuel ratio of the mixture in the mixer 11 is much closer to the stoichiometric air-fuel ratio (15.5) than in the high gear position.

Figure 6:
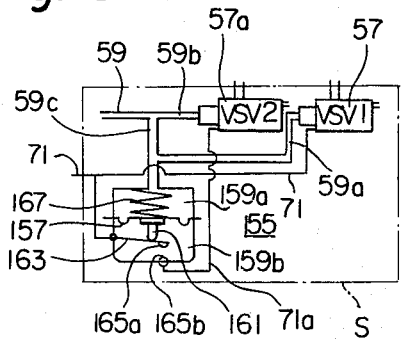
FIG. 6 is a block diagram illustrating a portion of a third embodiment of the present invention, which portion is constructed by partially modifying a corresponding portion of the second embodiment of FIG. 2.

FIG. 6 is a diagram illustrating a portion corresponding to the portion of the second embodiment surrounded by a broken line S in FIG. 2 and showing a modified embodiment in which a negative pressure switch is employed instead of the transmission switch 53 used in the embodiment illustrated in FIG. 2. As will be apparent from FIG. 6, a negative pressure switch 155 comprises a negative pressure chamber 159a and an atmospheric pressure chamber 159b, which are separated from each other by a diaphragm 157. A bias spring 167 is inserted in the negative pressure chamber 159a and an operation rod 161 is connected to the diaphragm 157 on the side of the atmospheric pressure chamber 159b. The negative pressure chamber 159a is so arranged that the negative pressure in the intake manifold is introduced in the negative pressure chamber 159a through negative pressure passages 59 and 59c. When the degree of the negative pressure in the negative pressure chamber 159a is reduced below a predetermined level, the bias spring 167 turns the operation rod 157 downwardly in FIG. 6 against the pressure acting on the diaphragm. As a result, switch contacts 165a and 165b are mated together so as to electrically connect control signal lines 71 and 71a. On the other hand, when the degree of the negative pressure in the negative pressure chamber 159a exceeds the above-mentioned predetermined level, the diaphragm 157 is displaced upwardly against the force of the bias spring 167 to open the switch contacts 165a and 165b. As will be apparent from the above-illustrated structure, under high-load operating conditions, for example, when the LPG engine is accelerated, the throttle valve 19 is opened to a great extent and the degree of the negative pressure is lowered so that the contacts 165a and 165b are connected. However, under low-load driving conditions, the degree of the negative pressure developing in the intake manifold 21 is increased, due to the closing of the throttle valve 19, and the contacts 165a and 165b are opened. Accordingly, this negative pressure switch 155 has quite the same functions as those of the transmission switch 53, in the embodiment shown in FIG. 2, and one or both of the two additional fuel supply passage are opened appropriately, depending on the change in the driving conditions of the LPG engine. When the above-mentioned predetermined level of the degree of the negative pressure in the negative pressure chamber 159a of the negative pressure switch 155 is set at, for example, −200 mm Hg, if the throttle valve 19 is opened to a great extent by depression of the accelerator pedal at the time of acceleration, the degree of the negative pressure is shifted to the atmospheric pressure beyond −200 mm Hg to close the negative pressure switch 155. This critical degree of the negative pressure for closing or opening the negative pressure switch 155 can be adjusted to an appropriate level by appropriately adjusting the force of the bias spring 167.

In the foregoing embodiments, the air-fuel ratio control arrangement of the present invention is applied to the LPG engine but, as will be apparent to those skilled in the art, the arrangement of the present invention can be similarly applied to a gasoline engine in which a lean air-fuel mixture is supplied through a carburetor. Further, in each of the foregoing embodiments, the switch for detecting the degree of opening of the throttle valve 19 is used as means for detecting the engine operating conditions requiring the feedback control of the air-fuel ratio; however, the present invention can also use a device for detecting the negative pressure in the intake manifold, a device for detecting the number of rotations of an engine, a device for detecting the flow amount of air sucked in an engine, a device for detecting the vehicle speed, a device for detecting the engine temperature, or a combination of two or more of these devices. Moreover, an air-fuel ratio sensor of the type which is disposed in the intake system of an engine can be similarly used in the present invention instead of the air-fuel ratio sensor specifically illustrated in the foregoing embodiments. According to the present invention, when the internal combustion engine is operated under low-load stable driving conditions, the engine is operated by a lean air-fuel mixture, and, when the feedback control is conducted under medium-load operating conditions, an additional fuel is supplied to the lean air-fuel mixture to be supplied to the engine through a fuel supply system to first cause air-fuel ratio determined by the carburetor or fuel gas mixer to approximate to the stoichiometric air-fuel ratio and, then, the feedback control of the air-fuel ratio is conducted. Therefore, the amount of the fuel to be supplied from the additional fuel supply nozzle for the feedback control can be reduced to a level as low as possible and the air-fuel ratio of the air-fuel mixture to be supplied to the engine can be controlled minutely and precisely to the stoichiometric air-fuel ratio. As a result, the performance of the three way catalytic converter can be exerted very effectively without occurrence of such undesirable phenomena as surge in the engine output.

Many modifications of the present invention will be possible in the light of the above-described teachings. It is, therefore, to be understood that within the scope of the appended claims the invention may be practiced otherwise than as specifically described.

What is claimed is:

1. An arrangement for controlling an air-fuel ratio of an air-fuel mixture in accordance with changes in an operating condition of an internal combustion engine which is provided with a catalytic converter in the exhaust system, prior to distributing the air-fuel mixture into combustion chambers to the engine through an intake system comprising:
    an initial stage mixing means for mixing in said intake system intake air with fuel supplied from a fuel source through a first fuel passage;
    an adjustable screw means for adjustably restricting the amount of the fuel flowing through said first fuel passage, so that an initial stage air-fuel mixture mixed by said first stage mixing means is leaner than the stoichiometric air-fuel ratio;
    a second fuel passage connecting said fuel source with an additional fuel supply nozzle element capable of supplying a predetermined amount of an additional fuel into said intake system, thereby enriching said initial stage air-fuel mixture toward the stoichiometric air-fuel mixture ratio;
    a first valve means capable of operating to open said additional fuel supply nozzle element upon being energized;
    sensing means for sensing a change in the air-fuel ratio of an air-fuel mixture supplied into the combustion chambers of the internal combustion engine and for delivering an electric control signal corresponding to sensed air-fuel ratio changes;
    electric control means responsive to said electric control signal for energizing said first valve means;
    means for detecting a change in the operating condition of the internal combustion engine and delivering a different control signal corresponding to the detected change to said electric control means;
    a third fuel passage for supplying an enriching fuel from said fuel source into said initial stage mixing means separately from said first fuel passage to enrich said initial stage air-fuel mixture until an air-fuel ratio thereof is closer to the stoichiometric air-fuel ratio;
    a second valve means disposed in said third fuel passage for producing a fluid communication between said fuel source and said initial stage mixing means through said third fuel passage upon being actuated, and;
    actuating means for actuating said second valve means in response to a signal from said electric control means responsive to said different control signal from said operating condition detecting means.

2. An arrangement for controlling an air-fuel ratio of an air-fuel mixture as claimed in claim 1, wherein said third fuel passage comprises a fuel flow pipe disposed so as to bridge between an upstream and downstream sides of said first fuel passage, said fuel flow pipe being provided at an intermediate portion thereof with at least one valve port cooperating with said second valve means.

3. An arrangement for controlling an air-fuel ratio of an air-fuel mixture as claimed in claim 2, wherein said fuel flow pipe of said third fuel passage has two branching pipes extending from said intermediate portion to said downstream side of said first fuel passage, said intermediate portion being formed with two said valve ports, and wherein said second valve means is provided with two valve elements cooperating with said two valve ports, respectively.

4. An arrangement for controlling an air-fuel ratio of an air-fuel mixture as claimed in claim 3, wherein said actuating means actuates said second valve means in such a manner that one of said valve elements firstly opens one of said cooperating valve ports and subsequently, the other of said valve elements opens the other of said cooperating valve ports.

5. An arrangement for controlling an air-fuel ratio of an air-fuel mixture as claimed in claim 4, wherein said actuating means actuates said second valve means so that said two valve elements open said two cooperating valve ports when said intake air as detected by an another engine operating condition detecting means exceeds a predetermined level.

6. An arrangement for controlling an air-fuel ratio of an air-fuel mixture as claimed in claim 1, wherein said initial stage mixing means comprises a carburetor connected to a gasoline engine forming said internal combustion engine.

7. An arrangement for controlling an air-fuel ratio of an air-fuel mixture as claimed in claim 1, wherein said initial stage mixing means comprises a LPG fuel mixer connected to a LPG engine forming said internal combustion engine.

8. An arrangement for controlling an air-fuel ratio of an air-fuel mixture as claimed in claim 1, wherein said actuating means comprises a diaphragm device provided with a diaphragm displaceable in response to a change of operating condition sensed by said operating condition detecting means, and an actuating rod having one end connected to the diaphragm and the other end associated with said second valve means.

9. An arrangement for controlling an air-fuel ratio of an air-fuel mixture as claimed in claim 1, wherein said operating condition detecting means comprises a throttle switch for detecting the degree of opening of the throttle valve.

10. An arrangement for controlling an air-fuel ratio of an air-fuel mixture as claimed in claim 5, wherein said another operating condition detecting means comprises a transmission switch detecting the gear position of a multiple speed transmission.

11. An arrangement for controlling an air-fuel ratio of an air-fuel mixture as claimed in claim 5, wherein said another operating condition detecting means comprises a negative pressure sensitive means detecting the change of the degree of the negative pressure in the intake manifold of the engine, and wherein said actuating means comprises a diaphragm device provided with at least two diaphragms displaceable in response to a change of the negative pressure detected by said negative pressure sensitive means and an actuating rod having one end connected to said diaphragm device and the other end thereof associated with said second valve means.

12. An apparatus for controlling the air-fuel ratio of an air-fuel mixture in accordance with changes in operating conditions of an internal combustion engine comprising:
 means for mixing intake air with fuel supplied from a fuel source through a first passage;
 adjustment means for adjustably restricting the fuel flowing through said first passage so that said mixing means produces an air-fuel mixture leaner than the stoichiometric air-fuel ratio;
 a second fuel passage for adding an additional amount of fuel from said fuel source to said air-fuel mixture to enrich said mixture to a point still less than the stoichiometric air-fuel ratio;
 means for sensing the air-fuel ratio of the air-fuel mixture supplied to the combustion chambers of said engine and for providing a first signal representative thereof;
 means for controlling the amount of fuel supplied through said second fuel passage in accordance with said first signal;
 means for sensing changes in the operating condition of said engine and providing a second signal representative thereof;
 a third fuel passage for supplying fuel from said source to said air-fuel mixture separately from said first or second fuel passages so that said mixture approaches said stoichiometric air-fuel ratio; and
 means for controlling the amount of fuel supplied through said third fuel passage in response to said second signal.

13. A method for controlling the air-fuel ratio of an air-fuel mixture in accordance with changes in operating conditions of an internal combustion engine comprising the steps of
 mixing intake air with fuel supplied from a fuel source through a first passage;
 adjustably restricting the fuel flowing through said first passage so that said mixing means produces an air-fuel mixture leaner than the stoichiometric air-fuel ratio;
 adding an additional amount of fuel from said fuel source to said air-fuel mixture through a second fuel passage to enrich said mixture to a point still less than the stoichiometric air-fuel ratio;
 sensing the air-fuel ratio of the air-fuel mixture supplied to the combustion chambers of said engine and providing a first signal representative thereof;
 controlling the amount of fuel supplied through said second fuel passage in accordance with said first signal;
 sensing changes in the operating condition of said engine and providing a second signal representative thereof;
 supplying fuel from said source to said air-fuel mixture through a third fuel passage separately from said first or second fuel passages so that said mixture approaches said stoichiometric air-fuel ratio; and
 controlling the amount of fuel supplied through said third fuel passage in response to said second signal.

* * * * *